(12) United States Patent
Liu et al.

(10) Patent No.: US 9,665,928 B1
(45) Date of Patent: May 30, 2017

(54) COLOR IMAGE PROCESSING SYSTEM AND COLOR IMAGE PROCESSING METHOD

(71) Applicants: AMBIT MICROSYSTEMS (SHANGHAI) LTD., Shanghai (CN); HON HAI PRECISION INDUSTRY CO., LTD., New Taipei (TW)

(72) Inventors: Wen-Jie Liu, Shanghai (CN); Chun-Qin Wang, Shanghai (CN); Lei Wang, Shanghai (CN)

(73) Assignees: AMBIT MICROSYSTEMS (SHANGHAI) LTD., Shanghai (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/976,088

(22) Filed: Dec. 21, 2015

(30) Foreign Application Priority Data

Dec. 14, 2015 (CN) .......................... 2015 1 0920555

(51) Int. Cl.
*G06T 5/00* (2006.01)
*G06T 1/00* (2006.01)

(52) U.S. Cl.
CPC .............. *G06T 5/00* (2013.01); *G06T 1/0007* (2013.01); *G06T 2207/10024* (2013.01)

(58) Field of Classification Search
CPC . G06T 5/00; G06T 1/007; G06T 2207/10008; G06T 2207/30176; G06T 7/0012
See application file for complete search history.

(56) References Cited

U.S. PATENT DOCUMENTS

| 5,477,346 | A | * | 12/1995 | Murata | ..................... G06T 7/12 358/529 |
| 6,038,348 | A | * | 3/2000 | Carley | ............... H04N 1/40068 358/448 |
| 6,701,010 | B1 | * | 3/2004 | Katsuyama | ............ G06K 9/342 382/165 |
| 2003/0231791 | A1 | * | 12/2003 | Torre-Bueno | ...... G01N 21/6428 382/133 |
| 2006/0269111 | A1 | * | 11/2006 | Stoecker | ............... G06F 19/321 382/128 |
| 2007/0070470 | A1 | * | 3/2007 | Takami | ................. G06F 17/212 358/527 |
| 2012/0195486 | A1 | * | 8/2012 | Kirenko | ............. A61B 5/02416 382/131 |

* cited by examiner

*Primary Examiner* — Jingge Wu
(74) *Attorney, Agent, or Firm* — Steven Reiss

(57) ABSTRACT

A color image processing system includes an image capture module, an image digitizing module, an optimizing ratio calculation module and an image processing module. The image capture module captures an original color image. The image digitizing module digitizes the original color image to obtain N pixels in ascending order according to value of RGB of the pixel. The optimizing ratio calculation module calculates an optimizing ratio H. The image processing module multiplies original value of RGB of the pixel before the ((N−N*H)/2)th pixel by 1/H to obtain new value of RGB of the pixel before the ((N−N*H)/2)th pixel and multiplies original value of RGB of the pixel after the ((N+N*H)/2−1)th pixel by H to obtain new value of RGB of the pixel after the ((N+N*H)/2−1)th pixel. A color image processing method is also provided.

4 Claims, 2 Drawing Sheets

COLOR IMAGE PROCESSING SYSTEM AND COLOR IMAGE PROCESSING METHOD

CROSS-REFERENCE TO RELATED APPLICATIONS

This application claims priority to Chinese Patent Application No. 201510920555.2, filed on Dec. 14, 2015, the contents of which are incorporated by reference herein.

FIELD

The subject matter herein relates to a color image processing system and a color image processing method.

BACKGROUND

Color images are digitized before displayed on a displayer. Because different sensitivity of color channel, light factor and so on, the color image may be distorted.

BRIEF DESCRIPTION OF THE DRAWINGS

Implementations of the present technology will now be described, by way of example only, with reference to the attached figures.

DETAILED DESCRIPTION

Figure 1:
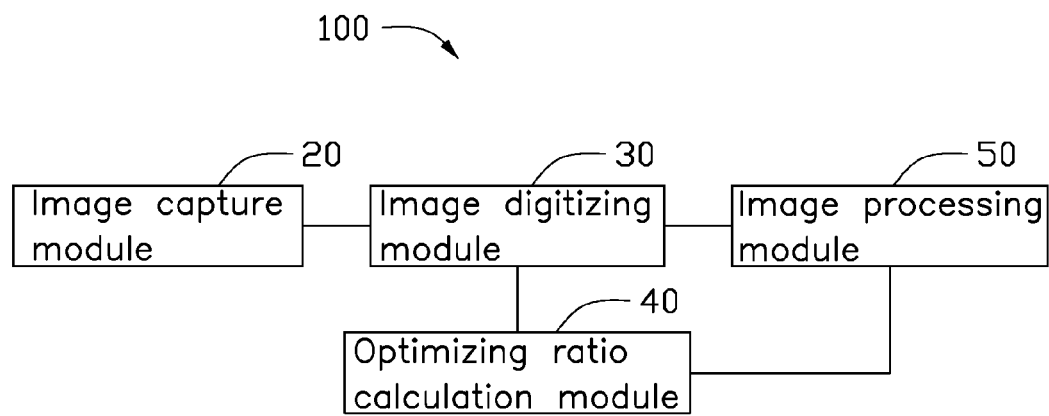
FIG. 1 is a block diagram of a color image processing system, according to an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to"; it specifically indicates open-ended inclusion or membership in a so-described combination, group, series, and the like.

FIG. 1 illustrates a color image processing system 100 according to an exemplary embodiment. The color image processing system 100 includes an image capture module 20, an image digitizing module 30, an optimizing ratio calculation module 40 and an image processing module 50.

The image capture module 20 is configured to capture an original color image. The image digitizing module 30 is configured to digitize the original color image to obtain N pixels in ascending order according to value of RGB of the pixel. The optimizing ratio calculation module 40 is configured to calculate an optimizing ratio $H=S1*H1+S2*H2+S3*H3$. $S_1$, $S_2$ and $S_3$ are ratios of areas of red color, green color and blue color from $\mu-3\sigma$ to $\mu+3\sigma$ in their own gaussian distribution. $H_1$, $H_2$ and $H_3$ are ratios of areas of red color, green color and blue color to a total area of the red color, green color and blue color.

The image processing module 50 is configure to multiply original value of RGB of the pixel before the $((N-N*H)/2)$th pixel by $1/H$ to obtain new value of RGB of the pixel before the $((N-N*H)/2)$th pixel and multiply original value of RGB of the pixel after the $((N+N*H)/2-1)$th pixel by H to obtain new value of RGB of the pixel after the $((N+N*H)/2-1)$th pixel. $(N-N*H)/2$ and $(N+N*H)/2-1$ are rounded to nearest integer.

The image processing module 50 is further configure to obtain new value of RGB $F(C)=M*C+Y$ of the pixel from the $((N-N*H)/2)$th pixel to the $((N+N*H)/2-1)$th. C is original value of the pixel from the $((N-N*H)/2)$th pixel to the $((N+N*H)/2-1)$th. M and Y satisfy $M*V_{min}+Y=V_{(N-N*H)/2}$ and $M*V_{max}+Y=V_{(N+N*H)/2-1}$. $V_{min}$ is the minimum value of the original value of RGB of N pixels. $V_{max}$ is the minimum value of the original value of RGB of N pixels. $V_{(N-N*H)/2}$ is the value of the original value of RGB of $((N-N*H)/2)$th pixel. $V_{(N+N*H)/2-1}$ is the value of the original value of RGB of $((N+N*H)/2-1)$th pixel.

Figure 2:
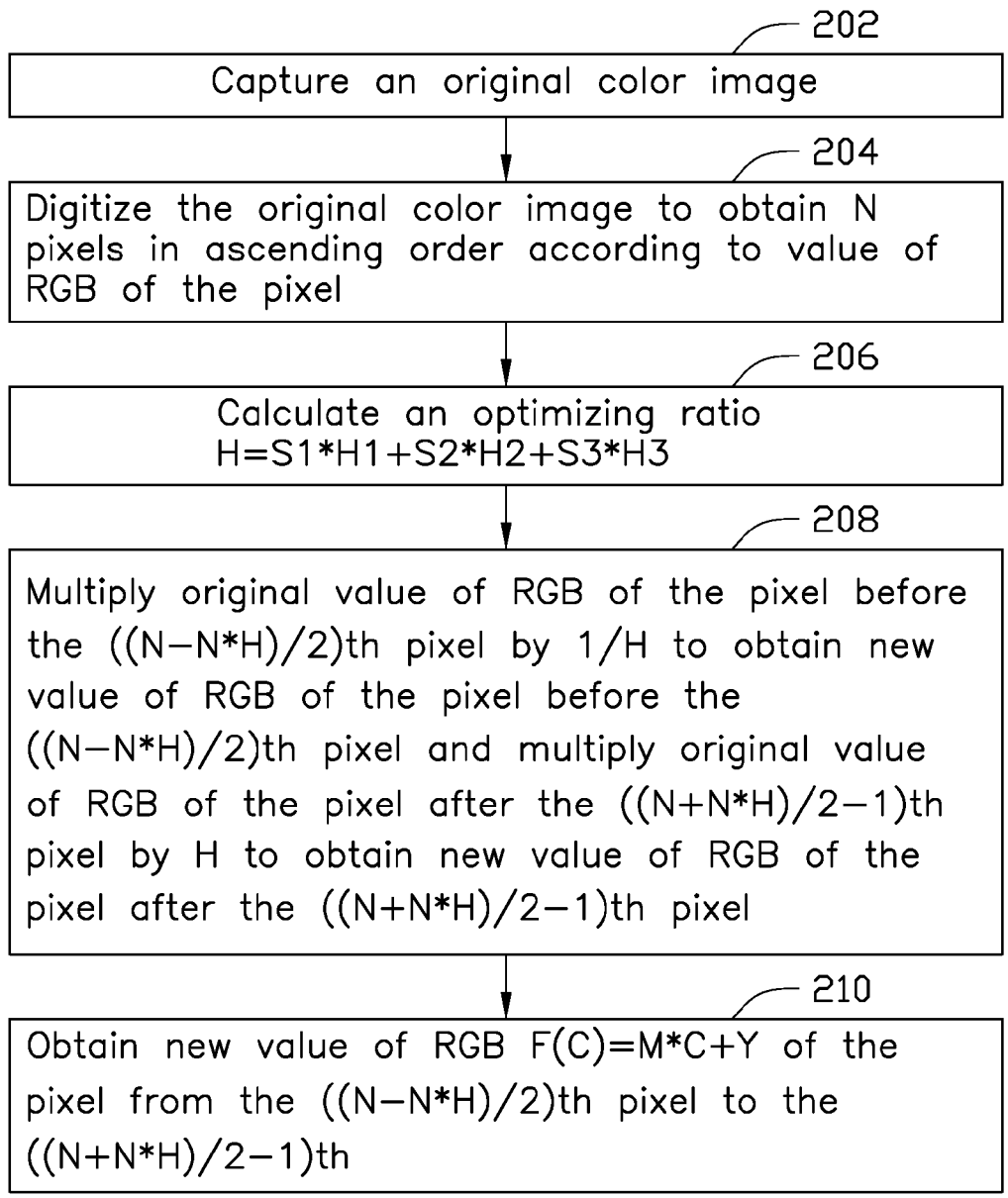
FIG. 2 is a flowchart of a color image processing method, according to an exemplary embodiment.

FIG. 2 illustrates a flowchart of a color image processing method according to an exemplary embodiment. The illustrated order of blocks in FIG. 2 is illustrative only and the order of the blocks can change. Additional blocks can be added or fewer blocks may be utilized without departing from this disclosure. The example method can begin at block 202.

At block 202, the image capture module 20 captures an original color image.

At block 204, the image digitizing module 30 digitizes the original color image to obtain N pixels in ascending order according to value of RGB of the pixel.

At block 206, the optimizing ratio calculation module 40 calculates an optimizing ratio $H=S1*H1+S2*H2+S3*H3$, wherein $S_1$, $S_2$ and $S_3$ are ratios of areas of red color, green color and blue color from $\mu-3\sigma$ to $\mu+3\sigma$ in their own gaussian distribution, $H_1$, $H_2$ and $H_3$ are ratios of areas of red color, green color and blue color to a total area of the red color, green color and blue color.

At block 208, the image processing module 50 multiplies original value of RGB of the pixel before the $((N-N*H)/2)$th pixel by $1/H$ to obtain new value of RGB of the pixel before the $((N-N*H)/2)$th pixel and multiplies original value of RGB of the pixel after the $((N+N*H)/2-1)$th pixel by H to obtain new value of RGB of the pixel after the $((N+N*H)/2-1)$th pixel, wherein $(N-N*H)/2$ and $(N+N*H)/2-1$ are rounded to nearest integer.

At block 210, the image processing module 50 obtains new value of RGB $F(C)=M*C+Y$ of the pixel from the $((N-N*H)/2)$th pixel to the $((N+N*H)/2-1)$th, wherein C is original value of the pixel from the $((N-N*H)/2)$th pixel to the $((N+N*H)/2-1)$th, M and Y satisfy $M*V_{min}+Y=V_{(N-N*H)/2}$ and $M*V_{max}+Y=V_{(N+N*H)/2-1}$, $V_{min}$ is the minimum value of the original value of RGB of N pixels. $V_{max}$ is the minimum value of the original value of RGB of N pixels, $V_{(N-N*H)/2}$ is the value of the original value of RGB of $((N-N*H)/2)$th pixel, $V_{(N+N*H)/2-1}$ is the value of the original value of RGB of $((N+N*H)/2-1)$th pixel.

The embodiments shown and described above are only examples. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims.

What is claimed is:

1. A color image processing system comprising:
   an image capture module configured to capture an original color image;
   an image digitizing module configured to digitize the original color image to obtain N pixels in ascending order according to value of RGB of the pixel;
   an optimizing ratio calculation module configured to calculate an optimizing ratio H=S1*H1+S2*H2+S3*H3, wherein $S_1$, $S_2$ and $S_3$ are ratios of areas of red color, green color and blue color from $\mu-3\sigma$ to $\mu+3\sigma$ in their own gaussian distribution, $H_1$, $H_2$ and $H_3$ are ratios of areas of red color, green color and blue color to a total area of the red color, green color and blue color; and
   an image processing module configure to multiply original value of RGB of the pixel before the ((N−N*H)/2)th pixel by 1/H to obtain new value of RGB of the pixel before the ((N−N*H)/2)th pixel and multiply original value of RGB of the pixel after the ((N+N*H)/2−1)th pixel by H to obtain new value of RGB of the pixel after the ((N+N*H)/2−1)th pixel, wherein (N−N*H)/2 and (N+N*H)/2−1 are rounded to nearest integer.

2. The color image processing system as claimed in claim 1, wherein the image processing module is further configure to set new value of RGB F(C)=M*C+Y of the pixel from the ((N−N*H)/2)th pixel to the ((N+N*H)/2−1)th, C is original value of the pixel from the ((N−N*H)/2)th pixel to the ((N+N*H)/2−1)th, M and Y satisfy $M*V_{min}+Y=V_{(N-N*H)/2}$ and $M*V_{max}+Y=V_{(N+N*H)/2-1}$, $V_{min}$ is the minimum value of the original value of RGB of N pixels, $V_{max}$ is the minimum value of the original value of RGB of N pixels, $V_{(N-N*H)/2}$ is the value of the original value of RGB of ((N−N*H)/2)th pixel, $V_{(N+N*H)/2-1}$ is the value of the original value of RGB of ((N+N*H)/2−1)th pixel.

3. A color image processing method comprising:
   capturing an original color image;
   digitizing the original color image to obtain N pixels in ascending order according to value of RGB of the pixel;
   calculating an optimizing ratio H=S1*H1+S2*H2+S3*H3, wherein $S_1$, $S_2$ and $S_3$ are ratios of areas of red color, green color and blue color from $\mu-3\sigma$ to $\mu+3\sigma$ in their own gaussian distribution, $H_1$, $H_2$ and $H_3$ are ratios of areas of red color, green color and blue color to a total area of the red color, green color and blue color; and
   multiplying original value of RGB of the pixel before the ((N−N*H)/2)th pixel by 1/H to obtain new value of RGB of the pixel before the ((N−N*H)/2)th pixel and multiplying original value of RGB of the pixel after the ((N+N*H)/2−1)th pixel by H to obtain new value of RGB of the pixel after the ((N+N*H)/2−1)th pixel, wherein (N−N*H)/2 and (N+N*H)/2−1 are rounded nearest integer.

4. The color image processing method as claimed in claim 3, further comprising:
   obtaining new value of RGB F(C)=M*C+Y of the pixel from the ((N−N*H)/2)th pixel to the ((N+N*H)/2−1)th, wherein C is original value of the pixel from the ((N−N*H)/2)th pixel to the ((N+N*H)/2−1)th, M and Y satisfy $M*V_{min}+Y=V_{(N-N*H)/2}$ and $M*V_{max}+Y=V_{(N+N*H)/2-1}$, $V_{min}$ is the minimum value of the original value of RGB of N pixels, $V_{max}$ is the minimum value of the original value of RGB of N pixels, $V_{(N-N*H)/2}$ is the value of the original value of RGB of ((N−N*H)/2)th pixel, $V_{(N+N*H)/2-1}$ is the value of the original value of RGB of ((N+N*H)/2−1)th pixel.

* * * * *